United States Patent [19]

McNeillie et al.

[11] Patent Number: 4,729,835

[45] Date of Patent: Mar. 8, 1988

[54] PROCESS FOR WASTE TREATMENT

[75] Inventors: Alastair McNeillie, Runcorn; David B. Mobbs, Handforth, both of England

[73] Assignee: Interox Chemicals Limited, London, England

[21] Appl. No.: 910,969

[22] Filed: Sep. 24, 1986

[30] Foreign Application Priority Data

Oct. 10, 1985 [GB] United Kingdom ............... 8525047

[51] Int. Cl.$^4$ .................................. C02F 1/72
[52] U.S. Cl. .................................. 210/759; 210/916; 210/763; 423/571; 423/224; 423/225; 208/196; 502/317
[58] Field of Search ............... 210/759, 765, 763, 908, 210/916, 928; 423/571, 224, 225; 208/196; 502/317

[56] References Cited

U.S. PATENT DOCUMENTS

| | | | |
|---|---|---|---|
| 1,900,751 | 3/1933 | Baehr | 423/224 |
| 4,361,487 | 11/1982 | Hills et al. | 210/759 |
| 4,363,215 | 12/1982 | Sharp | 210/763 |
| 4,427,576 | 1/1984 | Dupin | 423/224 |
| 4,443,342 | 4/1984 | Stas et al. | 210/759 |

FOREIGN PATENT DOCUMENTS

| | | | |
|---|---|---|---|
| 0173880 | 8/1985 | European Pat. Off. | |
| 2522279 | 12/1975 | Fed. Rep. of Germany | 423/224 |
| 2271862 | 5/1975 | France | |
| 3095170 | 8/1978 | Japan | 210/759 |
| 3149164 | 12/1978 | Japan | 423/224 |

OTHER PUBLICATIONS

Bortolini, O., et al, "Met.Catal. in Oxi.by Perox. Sulf.Oxi. & Ole. Epox.by Dilu.Hydro.Perox.Cata.by Moly.& Tung.Deriv.under Phase-Transf. Conditions, J. Org. Chem. 50 (15): 2688 (1985).

Cotton, F. A. and Wilkinson, G.; Adv. Inorg. Chem-A Comprehensive Text, Second Edition, Interscience Publishers, J. Wiley & Sons.

Primary Examiner—Peter Hruskoci
Assistant Examiner—Coreen Y. Lee
Attorney, Agent, or Firm—Larson and Taylor

[57] ABSTRACT

Organic sulphides are extremely malodorous compounds that are found in gaseous or aqueous effluents from many industries such as paper and pulp manufacture, hydrocarbon refining, tanneries, and in the synthesis of organic sulphur compounds. Their removal is necessary before such effluents can be discharged into the environment.

In the present invention their removal is effected using hydrogen peroxide at a pH controlled to pH 8.5 to 11.5 and in the presence of a catalytic amount of a soluble tungstate. Such a process is especially applicable to the removal of dialkyl disulphides, which are regarded as being especially difficult to remove oxidatively. In especially preferred conditions, the pH is about pH 11 and about 3–4 moles $H_2O_2$ is used per mole equivalent of sulphur, in the presence of at least 20 ppm sodium tungstate (as W).

17 Claims, No Drawings

PROCESS FOR WASTE TREATMENT

BACKGROUND OF THE INVENTION

1. Field of the Invention

The present invention relates to a process for waste treatment, and more particularly to improvements in a process for the removal or elimination of odour from gaseous or liquid effluents containing odorous organic sulphide compounds.

2. Description of the Prior Art

Organic sulphide compounds have acquired a reputation as a class for being evil smelling, noxious and in some cases toxic. Accordingly, in order that effluents may be permitted to be discharged into the environment, it is of public concern that they be removed beforehand from the effluents. Various sub-classes of organic sulphides includes mercaptans, dialkyl sulphides, dialkyl disulphides and thio substituted aryl or alicyclic compounds. Such sulphur compounds can be generated as by-products in a variety of industries, for example, in the paper industry, in which digestion of wood chips in the Kraft process causes malodorous compounds to be present in the resultant black liquors, the condensates from digestion and various wash waters and pulp-bleaching waters. Concentration of the black liquor and its subsequent calcination also produces unacceptable smells. Other industries include the petroleum and gas-refining industries which suffer similarly as a result of the raw feedstock being contaminated with sulphur and sulphides, at least part of which is converted to organic sulphides such as mercaptans during the various crack and fractionating process steps. A further industry is that of animal carcass rendering, which produces a mixture of by-products of which a significant contributor to the offensive smell of them is the class of organic sulphides. In a yet further industry, the organic synthesis of e.g. fungicidal, insecticidal or antibiotic intermediates and vulcanisation of rubber can generate gaseous effluents containing organic sulphides.

It has hitherto been suggested to remove or eliminate organic sulphides by oxidation of them with hydrogen peroxide in an aqueous acidic medium, preferably at pH 3-5 and preferably in the presence of a copper catalyst, as disclosed by Stas et al in U.S. Pat. No. 4,443,342, reissued April 1984 and assigned to Interox. Such a process is more effective than the similar use of iron as disclosed in the Effluent and Water Treatment Journal, August 1979, Focus on Interox, but it is not always convenient to employ acidic conditions because mercaptans have only limited solubility in aqueous acidic media and discharge of copper at higher than trace concentrations is also unacceptable.

SUMMARY OF THE INVENTION

Accordingly, it is an object of one aspect of the present invention to allow effluents containing high levels of organic sulphides to be effectively treated and thereby in certain embodiments to remove and treat the high levels of odorous sulphur compounds from gaseous effluents.

According to the present invention there is provided a process for the treatment of waste effluent in which an aqueous liquor containing organic sulphide compounds, which is either an aqueous effluent or a liquor obtained by scrubbing a gaseous effluent, is adjusted to a pH of from 8.5 to 11.5 and is contacted with at least two moles of hydrogen peroxide or adduct per mole of organic sulphide and in the presence of a catalytic amount of a water-soluble oxotungsten compound, whereby the organic sulphides are oxidised to substantially odour-free compounds.

DESCRIPTION OF THE PREFERRED EMBODIMENTS

The catalyst employed is most conveniently an alkali metal tungstate though, of course, the acid itself may be introduced whereupon it will be neutrallised in situ. The amount of catalyst to employ is normally at least 1 ppm herein always calculated as the metal, unless otherwise stated, and usually less than 500 ppm. The actual amount is at the discretion of the process user and will take into account the concentration of organic sulphide, the amount of hydrogen peroxide oxidant available and the rate at which oxidation is required in order to effect substantial removal of the malodorous compounds in the apparatus available. In many instances, it it practical to employ from 5 to 100 ppm tungsten catalyst, which with excess hydrogen peroxide can often achieve substantially complete conversion of the organic sulphides within residence (hold-up) times encountered for aqueous effluents of 10–30 minutes and especially at concentrations of over 20 ppm, odour elimination even more quickly, such as 5 to 10 minutes becomes feasible. This is especially beneficial in that the invention, under at least preferred conditions, enables high concentrations of organic compound in the effluent to be treated rapidly and thereby needing only comparatively small scale apparatus to be used.

Where the treated effluent is intended for discharge without any further processing such as ion exchange or solvent extraction to recover the tungsten, it is commercially prudent to select low concentrations of tungsten such as 5 to 25 ppm and employ hold-up times of 10 to 100 minutes, whereas in closed loop systems, as for example in the stripping of odours from a gaseous effluent, higher levels even up to 500 ppm tungsten and short reaction/residence times are more advantageous.

One of the critical features of the present invention is the control of the alkalinity of the aqueous medium in which the de-odourisation takes place. If the medium is either too alkaline or insufficiently alkaline the net result is the same, namely that the rate and extent of odour removal decreases. Since even small concentrations of the organic sulphides are all too easily detected by the human nose, it is therefore highly beneficial to select a pH that is at or near the optimum, namely from pH 10 to 11.5.

The organic sulphide compounds are often mercaptans, dialkyl or dicycloalkyl sulphides or disulphides. Of these dialkyldisulphides have been suggested by Stas in U.S. Pat. No. 444,342 to be particularly resistant to peroxidic oxidation and it will be understood that there seems to be indications that partial oxidation of mercaptans can generate dialkyl disulphides so that the instant invention, by accelerating dialkyl disulphide oxidation also speeds up mercaptan conversion too. This invention provides conditions tailored specially to the removal of dialkyl disulphides and any sulphides that generate them as intermediate in their removal. Advantageously, under such conditions not only are dialkyl disulphides removed but dialkyl sulphides are similarly removed, so that there is no need to employ two different sets of conditions to remove both. Typically the alkyl group in the organic sulphides is a linear or branched group containing one to ten linear carbon atoms and in many effluents are methyl, ethyl, propyl or cyclohexyl. Their existence is betrayed by their smell and readily confirmed by conventional gas-liquid chromatographic analytical techniques.

The amount of hydrogen peroxide to employ is at least partly at the discretion of the user, the greater the amount present, the faster the oxidative removal of the organic sulphides. In general, a convenient way of expressing hydrogen peroxide addition is by weight relative to the equivalent weight of sulphur in the organic sulphide (which is usually converted to weight equivalent $H_2S$). Expressed in that way, it is usual to add at least 1 part by weight $H_2O_2$ per part by weight $H_2S$ equivalent and normally not more than 10 parts per part by weight $H_2S$ equivalent. It is of practical benefit to employ from 2.5 to 5 parts by weight $H_2S$ equivalent and in many instances the amount is selected in the very narrow band of 3 to 4 parts $H_2O_2$ per part by weight $H_2S$ equivalent.

The odour-removal step can be carried out on any aqueous liquid effluent, i.e. at any temperature from just above 0° C. to 100° C., but preferably is controlled to below 80° C. in order to minimise wasteful decomposition of the hydrogen peroxide. In many instances, the temperature is controlled to within the range of 40°-70° C., and for treatment of relatively concentrated effluent liquors this can be achieved by the self-regenerated temperature rise caused by the exothermic nature of the reaction, and the need is to cool the treatment vessel (e.g. by cooling coils or a water jacket or by pumping through an external heat exchanger). However, there is no need to heat the effluent to achieve rapid odour-removal, so that the system of the instant invention permits effluents at ambient (10°-30° C.) to be treated. The hydrogen peroxide can be introduced as a concentrated aqueous liquid, typically 30-75% w/w such as solutions commercially available at approximately 35, 50 or 70% w/w concentrations. Alternatively, some or all can be introduced in the form of an adduct such as sodium perborate or percarbonate.

In one aspect of the present invention, the effluent to be treated is gaseous, and the invention process can treat not only effluents containing only a few ppm organic sulphide, but is even suitable for effluents containing very high concentrations of over 1000 ppm. Indeed, this process can even be applied where a substantial or major fraction of the gaseous effluent comprises organic sulphides. In this aspect of the process, the gaseous effluent is scrubbed with an aqueous alkaline solution, the pH of which is at least as high and preferably higher than in the subsequent stage of catalysed peroxide deodorisation. By so employing such a first stage alkaline scrub, the mercaptans, which are often the sulphidic compounds from which other sulphides are formed by partial oxidative treatment, can be taken into solution as the alkali metal salt. This is particularly beneficial since the salt, e.g. the sodium salt, is more soluble than the mercaptan itself, thereby avoiding the problems associated with a two phase system such as impaired reaction rate caused by the need to transfer organic sulphide from the organic into the aqueous phase. At the same time, though, this technique allows a comparatively small scrubber unit to be employed, thereby minimising plant costs. The subsequent introduction of an aqueous acidic solution of hydrogen peroxide for the odour removal stage effects some pH reduction of the solution, as can in situ generation of organic sulphur acids during the sulphide removal. Thus the two stages can combine the benefits of a higher pH for dissolution followed by optimum pH for deodorisation. It will be recognised that the two stages can form a cycle in which the liquor is rendered more alkaline, passes to a scrubber system, is treated with $H_2O_2$ and thence to holding tank or tanks from whence it is recycled. When the concentration of oxidation products approaches that at which further production would induce precipitation, for example in the scrubbing system, a proportion of the liquor can be removed each cycle, thereby establishing an equilibrium.

In the cyclic process there is a further complicating factor, namely the residual concentration of hydrogen peroxide in any liquor recycled to the scrubbing system. At first glance, it would seem that the benefit of a cyclic system would be that excess hydrogen peroxide could be most readily recycled, so that the rate of deodorisation would be maximised by using substantially excessive mole or weight ratios of $H_2O_2$ over that required for the oxidation process, in recognition of the fact that any residual amount would not just be discharged wastefully but instead could be used in the next cycle. Instead, it is found that an excess of hydrogen peroxide in the recycled liquor can result in partial oxidation of the scrubbed organic sulphides in the scrubber itself with the formation of a separate phase that is highly concentrated in still odorous organic sulphides. This problem is minimised or totally avoided by limiting the concentration $H_2O_2$ in the recycled liquor to less than about 2000 ppm. In their turn, this is in practice achieved by controlling the addition of $H_2O_2$ in the odour removal stage to about 3.5 to 3.7 parts by weight per part of $H_2S$ equivalent and providing a sufficient residence time for the organic sulphide to be substantially removed. It will be recognised that this is especially a potential problem when the equivalent weight (as $H_2S$) in the effluent liquor is itself over and especially when it is considerably over 2000 ppm such as from 5000 to 100000 ppm.

The alkali can be introduced under the control of a pH detector to provide a pH for sulphide dissolution of pH 11 to pH 13.5, in many instances pH 12-13. Under steady state conditions addition of both alkali and oxidant would be steady also, so that the $H_2O_2$ could be introduced under the control of the pH detector too.

The scrubbers useful in the instant invention conveniently can be column wet scrubbers, and preferably packed. In view of the very rapid adsorption of mercaptans under the process conditions, the gaseous effluent and scrubbing liquor preferably flow counter currently.

Thus, the instant invention is well suited to the treatment of gaseous effluents produced in organic syntheses or in petrochemical refineries, and also for treatment of any liquid effluent containing organic sulphides such as effluents from paper mills and tanneries.

Having described the invention in general terms, it will now be exemplified more fully by reference to the following Examples and Comparisons.

EXAMPLES

Comparisons 1 and 2, Examples 3 to 6

By these Comparisons and Examples, the principle of the invention and its advantages over prior art processes is demonstrated.

In each example and comparison a synthetic solution of dimethyl disulphide (500 ppm) was treated by the introduction of concentrated aqueous $H_2O_2$ solution to 1% (10000 ppm of $H_2O_2$) and adjusted to pH 11 by introduction of sodium hydroxide. In comparison $C_1$ no catalyst was present, in comparison $C_2$ a soluble copper salt was used and in Examples 3 to 6 sodium tungstate was used. Throughout, the solutions remained at laboratory ambient temperature, about 21/22° C. Periodically, samples of the solutions were withdrawn and analysed by gas-liquid chromatography. The analyses were then converted to proportions of dimethyl disulphide removed, and these are summarised in Table 1. The figures for copper and tungstate are both as the metals themselves.

TABLE 1

| Comp/Ex | Catalyst & conc ppm | | % Dimethyl disulphide removed after sample time/minutes |
|---|---|---|---|
| C1 | — | — | 3% - 10 min |
| | | | 25% - 20 min |
| C2 | Cu | 50 | 35% - 10 min |
| | | | 48% - 20 min |
| Ex 3 | W | 50 | 52% - 30 min |
| | | | 57% - 2 min |
| Ex 4 | W | 10 | 100% - 6 min |
| | | | 60% - 7 min |
| Ex 5 | W | 25 | 100% - 30 min |
| | | | 6% - 2 min |
| Ex 6 | W | 100 | 100% - 10 min |
| | | | 100% - 2 min |

From Table 1 it can be seen that under otherwise identical conditions, neither copper nor no catalyst was as good as tungsten in Ex3, and that even at 10 ppm the tungsten was far more effective than copper at 50 ppm—100% compared with 52% removal after 30 minutes.

COMPARISONS 7, 11, 12 AND EXAMPLES 8, 9 AND 10

In these Examples and Comparisons, the trials were carried out on solutions containing dimethyl disulphide (DMDS) (500 ppm) and into which was introduced 9 moles of $H_2O_2$ per mole of DMDS, i.e. 4.5 parts $H_2O_2$ per part by weight $H_2S$ equivalent. All the trials were carried out at ambient temperature and using 50 ppm (as W) sodium tungstate so that the only variable was the pH to which the solution was adjusted and maintained with sodium hydroxide. The residual DMDS concentrations were measured as in the preceding Examples by g.l.c. techniques, but it became apparent when 100% removal had been effected because the foul smell no longer persisted. The results are summarised in Table 2 below.

TABLE 2

| Comp/Ex | pH | Time (mins) taken for DMDS Removal of | | |
|---|---|---|---|---|
| | | 80% | 90% | Total |
| C7 | 7 | 60 | Not reached | |
| 8 | 9 | 13 | 20 | 37 |
| 9 | 10 | 11 | 14 | 22 |
| 10 | 11 | 6 | 8 | 12 |
| C11 | 12 | 44 | 63 | Not reached |
| C12 | 13 | 50 | 70 | Not reached |

The term not reached indicates that total removal was not attained in the course of the trial. Since residence times in excess of an hour are generally impractical in bulk waste treatment processes, it is an indication that the processes in comparisons C7, C11 and C12 did not achieve the full objective of smell removal. These results also demonstrate that it is of critical importance to employ a very narrow pH range of from about pH 8.5 to pH 11.5 with the best results of all being obtained at about pH 11.

EXAMPLES 13 AND 14

The trial in Example 10 was repeated but employing respectively a 3:1 and 6:1 mole ratio of $H_2O_2$:DMDS instead of 9:1. Once again the extent of DMDS removal was measured by g.l.c. In Example 13, 80% removal was attained in about 37 minutes and 90% in about 60 minutes, which is an extremely effective use of hydrogen peroxide. In Example 14, 80% removal was effected in about 13 minutes and 90% in 19 minutes, with total removal being attained by 45 minutes.

EXAMPLES 15 AND 16

In these Examples, the aqueous effluent had a pH adjusted to pH 11 and contained dimethyl sulphide (DMS) at 84.8 ppm concentration. Sodium tungstate (respectively 50 or 20 ppm as W) and then $H_2O_2$ in a mole ratio to DMS of 4:1 were introduced at ambient temperature. Complete removal of the DMS was attained in respectively 10 and 15 minutes. This indicated that dimethyl sulphide is easier to oxidately remove than dimethyl disulphide and both can be removed under conditions tailored for the removal of the dimethyl disulphide.

EXAMPLE 17

In this Example, a gaseous effluent containing approximately 90% methyl mercaptan for demonstration purposes was treated continuously in a two stage scrubber/hydrogen peroxide oxidation system. The scrubber comprised a column of 5.1 cm diameter and 1.83 m height packed regularly with a polypropylene material from Sultzer, down which a sodium hydroxide solution having a pH inflow adjusted to and maintained between pH 12 and 13 was passed at a flow rate of 1.5 liters/minute and up which the gaseous effluent was passed at 20 liters/minute. The gas exiting from the scrubber was tested for methyl mercaptan by the Draeger tube test, and since none was detected the gas was vented into the atmosphere. The liquor which contained sodium tungstate, 100 ppm as W, was then mixed with aqueous $H_2O_2$ solution (33% w/w flow rate 0.27 liters/minute) giving a solution containing about 80,000 ppm $H_2O_2$ and having a pH 10.5 to 11, and passing through a plug flow reactor equipped with cooling, in which the liquor had a residence time of 20 minutes. The resultant liquor had a residual $H_2O_2$ content of about 1000 to 2000 ppm $H_2O_2$ and was odour free, there being no detectable methyl mercaptan or its partial oxidation product dimethyl disulphide. The liquor was then restored to pH 12–13 by mixing with 8% sodium hydroxide solution, flow rate 0.35 liters/minute and passed again to the scrubber. For long term continuous processing the volume of liquor in the cycle can be maintained roughly constant by bleeding off the amounts of hydrogen peroxide and sodium hydroxide liquor introduced each cycle.

This example demonstrates the applicability of the instant invention to removal of odour from even highly concentrated gaseous effluents.

We claim:
1. In a process for the treatment of waste effluent in which an aqueous liquor containing organic sulphide compounds is contacted with hydrogen peroxide in the presence of a catalyst, the improvement wherein the pH of the liquor is adjusted to about 8.5 to 11.5, and the liquor is contacted with at least two moles of hydrogen peroxide or adduct per mole of organic sulphide in the presence of a catalytic amount of a water-soluble oxotungsten compound, whereby the organic sulphides are oxidised to substantially odor-free compounds.

2. A process according to claim 1 in which the concentration of catalyst is 5 to 100 ppm calculated as tungsten.

3. A process according to claim 1 in which the catalyst is an alkali metal tungstate.

4. A process according to claim 1, in which the amount of hydrogen peroxide introduced into the effluent or scrubbing liquor is from 2.5 to 5 parts $H_2O_2$ per part by weight organic sulphide, calculated as $H_2S$ equivalent.

5. A process according to claim 4 in which the amount of hydrogen peroxide introduced into the effluent or scrubbing liquor is from 3 to 4 parts $H_2O_2$ per part by weight organic sulphide, calculated as $H_2S$ equivalent.

6. A process according to claim 4 or 5 in which 5 to 100 ppm alkali metal tungstate (calculated as the metal) is employed.

7. A process according to claim 1 in which the effluent or liquor is maintained in the range of pH 10 to 11.5.

8. A process according to claim 1 in which the organic sulphide is adsorbed from a gaseous effluent by scrubbing in an aqueous alkaline solution in a prior stage.

9. A process according to claim 8 in which the alkaline scrubbing solution has a pH of about 1 to 2 units higher than in the subsequent hydrogen peroxide treatment stage.

10. A process according to claim 8 or 9 in which the scrubbing stage and hydrogen peroxide treatment stage from a cycle in which the liquor is rendered more alkaline and recycled to the scrubbing stage when organic sulphides are no longer detectable therein.

11. A process according to claim 10 in which the residual content of hydrogen peroxide in recycled liquor is not more than 2000 ppm on entry into the scrubber.

12. A process according to claim 9 in which the scrubbing solution has a pH in the range of pH 12 to 13 and in the hydrogen peroxide treatment stage the pH of the solution is in the range of pH 10 to 11.5.

13. A process according to claim 1, 8 or 12 in which the organic sulphides comprise mercaptans and/or aliphatic or cycloaliphatic disulphides.

14. A process according to claim 13 in which 5 to 100 ppm alkali metal tungstate (calculated as the metal) is present in solution and 3 to 4 parts $H_2O_2$ per part by weight organic sulphide, (calculated as $H_2S$ equivalent) is introduced in the $H_2O_2$ treatment stage.

15. A process according to claim 1 or 8 in which the hydrogen peroxide is introduced into an effluent or liquor which is maintained at a temperature below 80° C.

16. A process according to claim 15 in which no external heat is supplied to the effluent or liquor during the organic sulphide removal stage.

17. The process of claim 1, wherein the aqueous liquor is selected from the group consisting of an aqueous effluent and a liquor obtained by scrubbing a gaseous effluent.

* * * * *